United States Patent Office 3,122,688
Patented Feb. 25, 1964

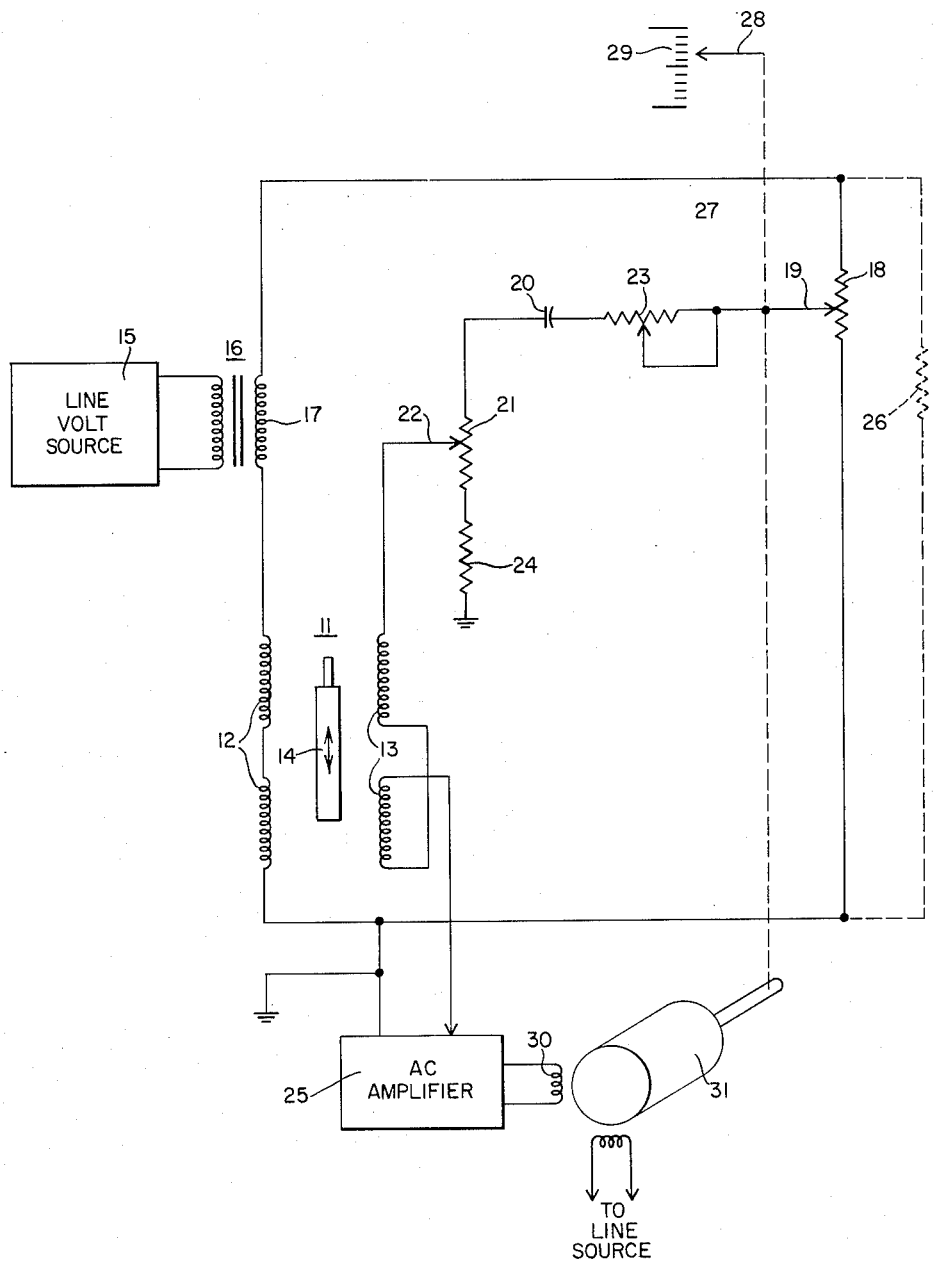

3,122,688
TEMPERATURE INSENSITIVE SERVO SYSTEM
Grover K. Houpt, Lansdale, Pa., assignor to Automatic Timing & Controls, Inc., King of Prussia, Pa., a corporation of Pennsylvania
Filed Oct. 11, 1961, Ser. No. 144,335
5 Claims. (Cl. 318—28)

This invention relates to an electrical system and in particular to a resistance-balanced servo system having special applicability where insensitivity to temperature changes is desired.

Servo systems are known in which two differential transformers are employed together with balancing potentiometers or slide wires. In these systems, sometimes known as "range coil" systems, a relatively low voltage level is applied to the potentiometer and they are therefore subject to interference from stray fields. Besides, since two differential transformers are required, they are relatively expensive. Other systems using a differential transformer include a potentiometer across its two series-aiding secondary windings, an amplifier being connected between the mid-point of the secondary windings and the movable arm of the potentiometer. While this system requires only one differential transformer and is therefore cheaper than the "range coil" type previously referred to, one problem arises in setting the range of this system conveniently and another problem arises because of the interaction between the phase and range adjustment. This system is also characterized by a relatively high sensitivity to temperature. Other servo systems employing a differential transformer have loads which are very low in value thereby making the system highly sensitive to temperature.

A primary objective of the invention is to provide a servo system using a differential transformer which is less expensive, and more reliable and stable, than previously known comparable systems.

Another object of the present invention is to provide a servo system to be employed with a differential transformer which is relatively insensitive to the effect of stray fields.

An object of the invention is to provide a servo system employing a single differential transformer wherein phase and range adjustments are relatively simple to make and in which there is relative insensitivity to temperature changes.

Still another object of the invention is to provide an inexpensive servo system employing a differential transformer capable of wide range operation without appreciable temperature-caused interference.

Other objects of the invention will be apparent to those skilled in the art from an examination of the drawings, specification and claims herein.

To accomplish these objects, I have invented a novel servo system for use with a single differential transformer and a balancing potentiometer which is relatively free from temperature-caused perturbations because the rebalancing voltage is proportional to the current in the primary winding of the differential transformer. My system comprises a series circuit which includes a source of exciting current for the differential transformer, a primary winding of the transformer, and the balancing potentiometer. It also comprises means for modifying the balancing voltage across the potentiometer so that it approximates the output voltage across the secondary winding of the differential transformer both in phase and amplitude. My system includes means for adjusting the amplitude without affecting the phase of the modified balancing voltage to any great extent.

The invention may be further appreciated from a consideration of the sole figure which is a schematic representation of a servo system in which one form of my invention is used.

In the sole figure a differential transformer 11 is provided having primary windings 12 and secondary windings 13 which are connected series-opposing. An armature 14 is adapted to move axially in response to motion applied thereto. A power transformer 16 is connected to a source 15 of line voltage, and its secondary winding 17 is connected in series with the primary windings 12 and ground. Also in series with the windings 12 and 17 is a potentiometer 18 having one of its terminals grounded. The slider or movable arm 19 of potentiometer 18 is coupled via a variable resistance 23 and a capacitor 20 to a potentiometer 21. A resistor 24 is in series with the potentiometer 21 and has one of its terminals grounded. The movable arm 22 of the potentiometer 21 is connected to one terminal of the windings 13, the other terminal thereof being connected to the input of an A.C. amplifier 25 whose other input terminal is grounded. Across the potentiometer 18 is a shunt resistance 26 shown in dashed lines. If desired, the movable arm 19 may be coupled as indicated by the dashed line 27 to an indicator arm 28 which moves along a scale 29. The output terminals of A.C. amplifier 25 are coupled to one winding 30 of a 2-phase A.C. servo motor 31. The second winding 32 of that motor is coupled to the source 15 of line voltage. The shaft of the motor 31 is coupled by appropriate mechanical linkage (not shown) to the movable arm 19 and the linkage arm 27.

*Operation*

As previously stated, since the potentiometer 18 is in series with the primary windings 12 and the source 15, the output of the differential transformer 11 is proportional to the primary current even if the resistance of the primary windings 12 changes because of temperature fluctuations or even if the resistance of the wiring changes. By inserting the potentiometer 18 in this way undesired temperature effects are avoided. However, since the voltage applied from the secondary windings 13 to the movable arm 22 is approximately 90° different in phase from the voltage developed across the potentiometer 18, the capacitor 20 is inserted in series with the arm 19. This capacitance together with the resistance of the potentiometer 21 and the vernier resistance of variable resistor 23 provides the necessary phase compensation. The values of the capacitor 20 and the potentiometer 21 must be great enough so as not to cause excessive non-linearity due to loading of the potentiometer 18. To match the amplitude of the voltage across the potentiometer 18 with the amplitude of the voltage across the secondary windings 13, the resistance of the resistive element 21 is made to be adjustable, but the movement of the arm 22 does not affect the phase shift characteristics to any appreciable extent. A shunt resistor 26 may be found necessary, depending on the constants of the circuit being used, to compensate for the effect on gain of the phase-shift circuit. The value of resistor 26, if required, is selected so as to provide a voltage across the potentiometer 18 which is many times greater than the output signal of the transformer 11 at maximum displacement of the armature 14. In effect, the resistance element 26 is a range shunt resistance which may be required to produce the proper voltage drop across the potentiometer 18. Since all of the noise-sensitive components of the circuit, i.e., potentiometer 18, potentiometer 21, amplifier 25, and transformer 16 have one terminal grounded, noise in the system is considerably reduced. Furthermore, since the voltage across the potentiometer 18 is at a very high level because of its direct coupling to the primary windings 12, the effects of stray electric and magnetic fields are minimized. Also, since the source impedance of the voltage across the potentiometer 21 is kept low stray-field pickup is minimized and low input impedance amplifiers may be used. By using readily available components such as wire-wound resistors and plastic-dielectric capacitors, variations introduced by temperature changes are minimized and may be on the order of 100 parts per million per degree centigrade. If desired, for even more temperature stability components 18, 21, 24, and 26 may be selected to have temperature characteristics appropriate for compensating the characteristics of the other elements of the circuit.

If desired, the phase-shift components illustrated may be supplanted by other combinations of resistive or inductive elements, the inductive element being placed in shunt with the potentiometer 18. The resistive element could replace capacitor 20. Of course, any combination of such elements may be resorted to providing the necessary shift is obtained.

As illustrated, the output of the A.C. amplifier 25 is coupled to a 2-phase A.C. servomotor, but a D.C. could be alternatively used if the output of the amplifier is first compared in phase with that of the line voltage in a conventional phase comparator. The comparator output would then be fed to the D.C. motor, the polarity and amplitude of the output determining the direction and speed at which the motor shaft would revolve.

My invention may also be used with three-winding differential transformers as well as four-winding types. Also, it can be used with components similar or equivalent to differential transformers which have an A.C. output which is a function of current in its input circuit.

I claim:

1. In combination: a differential transformer having primary and secondary windings and an armature movable with respect to said windings, a source of an A.C. voltage in series with said primary winding, a variable resistance element in series with said source and said primary winding, said variable resistance including a movable element, means directly connected to said secondary winding and to said movable element for producing a shift in the phase of the voltage developed across said variable resistance, and means coupled to said secondary winding and to said movable element for varying the position of the latter in response to changes in the position of said armature relative to said transformer windings.

2. In combination: a differential transformer having an armature and primary and secondary windings, a source of an A.C. voltage in series with said primary windings, a variable resistance element in series with said source and said primary winding, said variable resistance including a movable element, an RC circuit coupled to said movable element and to said secondary winding for producing a shift in the phase of the voltage developed across said variable resistance element, and motor means coupled to said secondary winding and to said movable element for varying the position of said movable element in response to changes in the position of said armature relative to the position of said windings.

3. In combination: a differential transformer having a primary and a secondary winding and an armature, a source of an A.C. voltage in series with said primary winding, a first variable resistance element in series with said source and said primary winding, said variable resistance having a movable element, an RC circuit directly connected to said movable element for compensating for the difference in phase of the voltage across said primary and secondary windings, a second variable resistance element coupled to said RC circuit and to said secondary winding, an amplifier coupled to said first and second windings, a servomotor coupled to said amplifier and to said movable element for varying the position of the latter in response to changes in the position of said armature with respect to said windings.

4. The combination according to claim 3 with the addition of a fixed resistance element parallel with said first variable resistance element for assisting in providing a voltage across said first variable resistance element which is considerably larger than the signal produced in the secondary of said transformer at the maximum signal-producing displacement of said armature with respect to said windings.

5. The combination according to claim 3 with the addition of means coupled to said movable element for producing an indication representative of the position thereof.

References Cited in the file of this patent

UNITED STATES PATENTS 2,945,166   Bell et al. _____ July 12, 1960